Dec. 12, 1961 D. N. MILLER, JR 3,012,812
EXHAUST DEVICE FOR VEHICLES
Filed Jan. 16, 1961

INVENTOR.
DANIEL N. MILLER, JR.
BY
Gustave Miller
ATTORNEY.

United States Patent Office 3,012,812
Patented Dec. 12, 1961

3,012,812
EXHAUST DEVICE FOR VEHICLES
Daniel N. Miller, Jr., 3144 Hamilton Way, Casper, Wyo.
Filed Jan. 16, 1961, Ser. No. 83,080
8 Claims. (Cl. 296—44)

This invention relates to an exhaust means, and it particularly relates to an exhaust means for venting the interior of an automobile or similar vehicle.

Heretofore, venting in automobiles has generally been accomplished by means of fan or vent windows placed in the forward portion of the car just behind the windshield and adjacent the driver on the one side and the front-seat passenger on the other side. These fan windows are generally either cranked or pushed and pulled into and out of open position, at which position they extend transversely to the main window and to the flow of air.

Because of its transverse position relative to the flow of air, there is a large amount of turbulence causing a great deal of noise and an undue amount of draft. Furthermore, even though the fan window may be adjusted to various positions of open position, it is still too large and cumbersome to permit a fine adjustment or control of venting operation. In addition, the open position of the fan window permits ingress of wind, rain, snow, dirt, dust and the like during inclement weather.

It is one object of the present invention to overcome the above disadvantages by providing a device for exhausting smoke, fumes and unpleasant odors which does not cause turbulence even during the greatest exhaust position and which does not permit ingress of rain, snow, dirt, dust or the like while in use.

Another object of the present invention is to provide an exhaust device, of the character described, which is relatively simple in construction, easy to install and easy to use.

Other objects of the present invention are to provide an improved exhaust device, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing in which.

Figure 1:
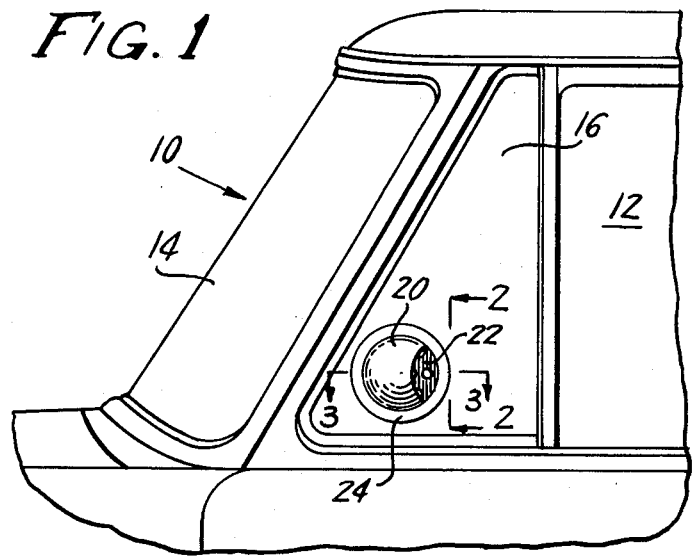
FIG. 1 is a side elevational view of an exhaust device embodying the present invention, shown installed in the fan window of an automobile.
Figure 2:
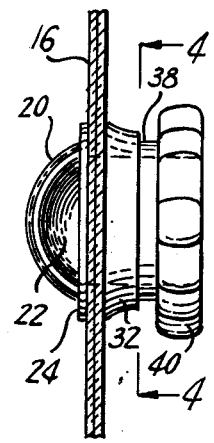
FIG. 2 is a sectional view taken on line 2—2 of FIG. 1.

Referring in greater detail to the drawing wherein similar reference characters refer to similar parts, there is shown an automobile, generally designated 10, comprising the usual window 12 and windshield 14. Between the window 12 on each side and the windshield 14 is a vent or fan window 16 of the ordinary type.

Figure 3:
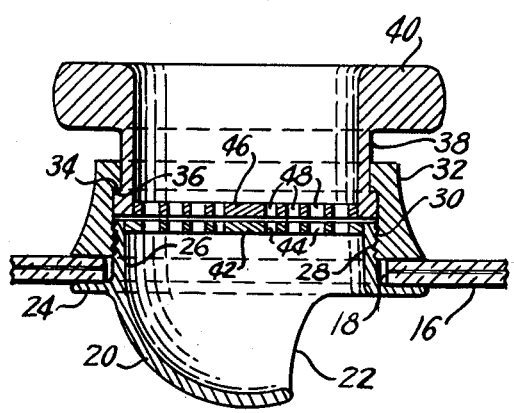
FIG. 3 is a sectional view taken on line 3—3 of FIG. 1.

In the lower forward portion of the fan window 16 is provided a hole 18 in which is positioned a substantially hemispherical bubble 20 made of transparent material such as Plexiglas or the like. The bubble 20 is provided with an offset opening 22 forming a nozzle (as best shown in FIG. 3).

The bubble 20 is provided with a lateral flange 24 overlying the rim of the hole 18. It is also provided with an inner cylindrical extension 26 which is at least partly externally threaded at 28. The threads 28 engage with the internal threads 30 of a collar 32. This collar 32 is provided with a shoulder 34 engaging a shoulder 36 on a barrel 38 having a knurled adjusting knob portion 40. The collar 32 not only rotatably holds the barrel 38 to the cylindrical extension 26 in a position to permit rotative adjustment of the barrel 38 but also clamps the bubble 20 to the window 16 because it coacts with the flange 24 to exert the clamping effect.

Figure 4:
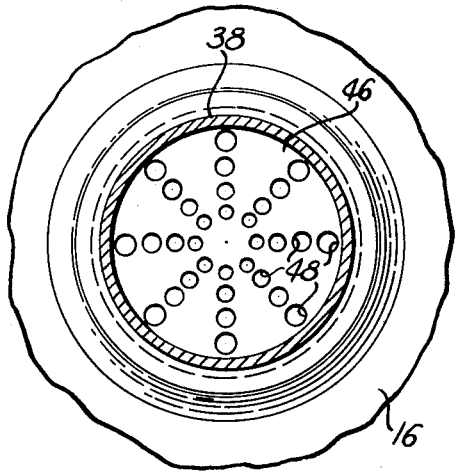
FIG. 4 is a sectional view taken on line 4—4 of FIG. 2.

The inner end of cylindrical extension 26 is provided with a disc 42 fixed thereto having a plurality of apertures 44 arranged in a plurality of radial rows. Opposite the discs 42, the barrel 38 is provided with a disc 46 fixed thereto also provided with radial rows of holes 48 (as best shown in FIG. 4).

In use, the amount of exhaust openings can be varied by means of the knob 40. By turning the knob 40 from inside the car 10, the driver can regulate the rotation of the disc 46 fixed to barrel 38 relative to the disc 42 fixed to extension 26 so that he can either have all the apertures 48 in direct alignment with the apertures 44 to obtain maximum exhaust, or he can move the apertures 48 completely out of alignment with aperatures 44 to completely close the exhaust device, or he can move the aperture 48 to partially cover the apertures 44 to obtain intermediate exhaust action.

As the car moves along, the exhaust air with its entrained fumes, dust, odors, etc., is drawn out of the transverse opening 22 and is caught up in the airstream and carried back and away. The airstream, as it flows past the transverse opening 22, also forms a partial vacuum at that area so that suction helps to withdraw the exhaust.

In addition to its other advantages, such as a suction forming means, the offset or transverse opening 22 prevents the direct ingress from the atmosphere of rain, snow, wind, dirt, dust, etc. In this respect, the farther wall surface of the bubble 20 acts as a baffle and the relatively large imperforate areas of the discs 42 and 46 act as further baffles to almost completely prevent any entrance of contaminating substances or rain or snow from the atmosphere.

The exhaust device is here illustrated as being provided on a fan window 16. However, it could be used to eliminate the use of fan windows entirely and could be mounted directly on one of the main windows 12 which could then be extended up to the windshield 14 or it could even be mounted in a door or in the body of the car itself. This would eliminate additional cost of materials and construction.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. An exhaust device for vehicles comprising a hemispherical bubble having an offset opening on one portion of its spherical surface and having a cylindrical extension, said extension having a closure disc fixed thereto provided with perforations in a predetermined pattern, an external flange on said cylindrical extension adjacent said bubble, a collar threaded externally on said cylindrical extension cooperating with said flange for clamping said device to a vehicle part through an opening therein with said bubble positioned outside said vehicle and said extension inside said vehicle, a barrel rotatably secured to said cylindrical extension, a closure disc fixed thereto on said barrel in face-to-face relation to the disc in said extension, said disc in said barrel having perforations in similar pattern to the apertures in said first mentioned disc, and means for rotating said barrel.

2. The device of claim 1, said bubble being transparent.

3. The device of claim 1, said means for rotating said barrel comprising a knurled knob on said barrel.

4. A vehicle having an exhaust device, said exhaust device being mounted in an opening in said vehicle and comprising a bubble of generally hemispherical shape with an offset opening in a portion of its hemispherical surface, a cylindrical extension on said bubble, said bubble being positioned outside said vehicle and said extension extending through said opening in said vehicle to the interior thereof, clamping means on said bubble and on said extension for releasably clamping said device to said vehicle, a barrel within said vehicle and rotatably connected to said extension, and mating discs in said extension and barrel, said discs having similar patterns of apertures adapted to be moved into and out of conjunction upon rotation of said barrel relative to said extension.

5. The vehicle of claim 4, and a knurled knob on said barrel.

6. The vehicle of claim 4, said bubble being transparent.

7. The vehicle of claim 4, said vehicle having a fan window, and said exhaust device being mounted in said fan window.

8. An exhaust device for vehicles comprising a hemispherical bubble having an offset opening on one portion of its spherical surface and having a cylindrical extension, said extension having a closure disc fixed thereto provided with perforations in a predetermined pattern, cooperating clamping means on said bubble and on said cylindrical extension for releasably clamping said device to a vehicle part with said extension extending through an opening in the vehicle part to the interior thereof, a barrel rotatably secured to said cylindrical extension, a closure disc fixed thereto on said barrel in face-to-face relation to the disc in said extension, said disc in said barrel having perforations in similar pattern to the apertures in said first mentioned disc, and means for rotating said barrel.

References Cited in the file of this patent

UNITED STATES PATENTS

| | | |
|---|---|---|
| 1,290,936 | Duckham | Jan. 14, 1919 |
| 1,525,429 | Hunter | Feb. 3, 1925 |
| 1,678,743 | Miller | July 31, 1928 |
| 1,733,025 | Lovel | Oct. 22, 1929 |
| 2,715,866 | Mousel | Aug. 23, 1955 |

FOREIGN PATENTS

| | | |
|---|---|---|
| 1,102,834 | France | May 11, 1955 |